United States Patent Office.

JAMES F. BABCOCK, OF BOSTON, MASSACHUSETTS.

Letters Patent No. 82,582, dated September 29, 1868.

---

IMPROVED COMPOSITION FOR GENERATING GASES IN FIRE-EXTINGUISHERS, AND FOR OTHER PURPOSES.

---

*The Schedule referred to in these Letters Patent and making part of the same.*

---

TO ALL WHOM IT MAY CONCERN:

Be it known that I, JAMES F. BABCOCK, of Boston, in the county of Suffolk, and State of Massachusetts, have invented an Improved Combustible Gas-Generating Composition for Fire-Extinguishing Apparatus, &c.; and I do hereby declare that the following is a description of my invention sufficient to enable those skilled in the art to practise it.

The invention relates to the manufacture of a composition to be used in generating a gas or gases by combustion, with particular reference to employment in fire-extinguishing apparatus, or in that class of such apparatus in which water contained in a vessel is ejected therefrom by the pressure of a gas generated within the same vessel, or within a compartment thereof, though the invention may be used for simply raising or forcing water or other fluid.

In the fire-extinguishing apparatus of this kind in common use, the gas is evolved by combining an acid and an alkali within the vessel to generate carbonic-acid gas, and in the Phillips fire-annihilating apparatus, made some years ago, a compound was burned to generate carbonic-acid gas, which gas itself was used to quench the fire.

My invention consists, primarily, in making or combining a composition (the combustion of which shall generate a gas to eject the fluid from a water-containing vessel) with a vehicle which shall prevent the compound from exploding, or which shall cause it, when lighted, to consume gradually, but with sufficient rapidity to generate the gas in such manner as to create a uniform pressure upon a body of water contained in the vessel, in a compartment of which the charge is placed, until the whole of the water, or any desirable part thereof, shall be ejected by the pressure of the gas.

The ingredients and proportions I prefer to use in making the compositions are mixtures of chlorates or nitrates of potassa or soda, with charcoal or sulphur, and silicates of soda or potassa, in liquid form, in varying proportion, according to the object for which the mixture is used. If for raising or propelling water simply, gases insoluble in water are required, such as nitrogen or carbonic oxide. The last of these is produced by a mixture of one hundred and twenty-two parts chlorate of potassa, thirty-six parts charcoal, both in fine powder, and made into a paste with liquid silicate of soda or potassa, and carefully dried.

Another mixture for the same purpose, furnishing both nitrogen and carbonic oxide, consists of nitrate of soda, one hundred and seventy parts; charcoal, sixty parts. Nitrate of potassa, two hundred and two parts, may be substituted for the nitrate of soda. These ingredients are to be in fine powder, and mixed with silicate of soda or potassa, as before.

If it is desired to produce carbonic-acid gas, the following compounds may be used: Chlorate of potassa, one hundred and twenty-two parts, charcoal, eighteen parts, mixed with silicate of soda or potassa; or, nitrate of soda, one hundred and seventy parts, charcoal, thirty parts, mixed with silicate of potassa or soda; or, nitrate of potassa, two hundred and two parts, charcoal, thirty parts, mixed with silicate of potassa or soda. Chlorate of soda may, in all cases, be substituted for the potassa salt, according to its chemical equivalent. Where nitrates are used, nitrogen gas is produced at the same time as the carbonic acid.

For producing sulphurous acid, mixtures of chlorate of potassa, one hundred and twenty-two parts, sulphur, forty-eight parts, mixed with silicate of potassa or soda. Nitrate of potassa or soda may be substituted in this case, in proportion according to its chemical equivalent.

These mixtures should be made and handled with care, the ingredients powdered separately, and mixed on a flat surface, or by sifting.

After the addition of the silicate of soda, there is no special precaution to be taken, as they are then non-explosive, and take fire with some difficulty. A quantity of powder, for example, being placed upon some of the paste, it may be fired without lighting the mixtures. Friction or percussion does not affect them.

Being thus prepared, the charges will remain unaltered for any length of time, being always ready for use.

The weight of the material required for charging a machine will vary, according to its size and the pressure required, and should be determined, by experiment for each mixture, for each different-sized machine. Having determined the amount for a machine of a certain size, the amount found to give the requisite pressure should always be adhered to for the same-sized machine.

For a machine holding eight gallons of water, from four to six ounces of either mixture will be found sufficient, producing a pressure varying from forty-five to seventy-five pounds. By using a larger charge, a greater pressure may be obtained.

Ammonia-water, containing, as it does, so much gas in solution, the gas being driven out by the slightest heat, and possessing so great a diffusive power, is also a very powerful agent in extinguishing flame, while the ammonia and the silicate of soda together, when thrown with water upon fire, produce one of the most efficient agents possible for rapidly and completely extinguishing fires, and rendering, at the same time, those substances wet with the mixture incapable of further combustion.

The cost of materials for producing the composition being very slight, enables a large body of liquid to be thrown upon a fire by connecting a tank holding from ten to twenty barrels of water with suitable pipes, which may be carried upon each story of a building, having stop-cocks at various points, to which a hose may be attached, as required, thus furnishing a large amount of water almost instantly, which can be thrown to a great distance or height.

I claim a combustible gas-generating composition, for use in fire-extinguishing and other fluid-ejecting apparatus, when combined with a vehicle for arresting rapid combustion, substantially as described.

JAS. F. BABCOCK.

Witnesses:
J. B. CROSBY,
FRANCIS GOULD.